US011593705B1

(12) United States Patent
Rouesnel

(10) Patent No.: US 11,593,705 B1
(45) Date of Patent: Feb. 28, 2023

(54) FEATURE ENGINEERING PIPELINE GENERATION FOR MACHINE LEARNING USING DECOUPLED DATASET ANALYSIS AND INTERPRETATION

(71) Applicant: Amazon Technologies, Inc., Seattle, WA (US)

(72) Inventor: Laurence Louis Eric Rouesnel, New York, NY (US)

(73) Assignee: Amazon Technologies, Inc., Seattle, WA (US)

(*) Notice: Subject to any disclaimer, the term of this patent is extended or adjusted under 35 U.S.C. 154(b) by 914 days.

(21) Appl. No.: 16/456,430

(22) Filed: Jun. 28, 2019

(51) Int. Cl.
*G06F 3/048* (2013.01)
*G06N 20/00* (2019.01)
*G06F 16/903* (2019.01)

(52) U.S. Cl.
CPC ....... *G06N 20/00* (2019.01); *G06F 16/90344* (2019.01)

(58) Field of Classification Search
CPC .................. G06N 20/00; G06F 16/90344
See application file for complete search history.

(56) References Cited

U.S. PATENT DOCUMENTS

| | | | |
|---|---|---|---|
| 2016/0132787 A1* | 5/2016 | Drevo | G06N 20/10 706/12 |
| 2018/0075357 A1* | 3/2018 | Subramanian | G06N 20/00 |
| 2019/0018821 A1* | 1/2019 | Ormont | G06N 20/20 |
| 2019/0050465 A1* | 2/2019 | Khalil | G06F 16/258 |
| 2019/0277913 A1* | 9/2019 | Honda | G01R 31/2894 |
| 2019/0342184 A1* | 11/2019 | May | G06N 5/02 |
| 2019/0370684 A1* | 12/2019 | Gunes | G06N 20/00 |
| 2020/0090056 A1* | 3/2020 | Singhal | G06N 20/20 |
| 2020/0193313 A1* | 6/2020 | Ghanta | G06F 16/9038 |
| 2020/0226130 A1* | 7/2020 | Amzal | G06N 20/00 |
| 2020/0265512 A1* | 8/2020 | James | G06N 20/20 |
| 2020/0265954 A1* | 8/2020 | Clark | G06N 5/02 |
| 2020/0311207 A1* | 10/2020 | Kim | G06F 40/30 |
| 2021/0141801 A1* | 5/2021 | Teague | G06F 16/258 |
| 2022/0188660 A1* | 6/2022 | Schoenharl | G06N 5/022 |
| 2022/0253647 A1* | 8/2022 | Perkins | G06K 9/6257 |
| 2022/0270128 A1* | 8/2022 | Padmanabhan | G06Q 30/0276 |

* cited by examiner

*Primary Examiner* — Rashawn N Tillery
(74) *Attorney, Agent, or Firm* — Nicholson De Vos Webster & Elliott LLP

(57) ABSTRACT

Techniques for feature engineering pipeline generation for machine learning using decoupled dataset analysis and interpretation are described. A feature engineering engine obtains a dataset and utilizes a number of analyzers to generate data facts associated with the columnar values of the dataset. The data facts are consolidated together as a set of data statements that are used by multiple interpretation engines that implement different strategies for treating the data in order to generate feature engineering pipeline code.

20 Claims, 9 Drawing Sheets

FEATURE ENGINEERING PIPELINE GENERATION FOR MACHINE LEARNING USING DECOUPLED DATASET ANALYSIS AND INTERPRETATION

BACKGROUND

The field of machine learning has become widely accepted as a significant driver of the future of technology. Organizations everywhere now seek to use machine learning techniques to address a wide variety of problems, such as optimizing aspects of their products, internal processes, customer experience, etc. While the high-level view of machine learning sounds simple—e.g., provide training data to a computer, to allow the computer to automatically learn from the training data to generate a model that can make predictions for other data—implementing machine learning techniques in practice can be tremendously difficult.

This difficulty is partially due to the underlying algorithmic and mathematical complexities of machine learning algorithms, which are typically developed by academic researchers or individuals at the forefront of the field. Additionally, it is also difficult to generate, update, and deploy useful models, which can be extremely time and resource consumptive and filled with complexities. Moreover, machine learning models tend to be extremely focused on particular use cases and operating environments, and thus any change to the underlying environment or use case may require a complete regeneration of a new model. Further, constructing and deploying machine learning technologies is quite different from traditional software engineering, and requires practices and architectures different from what traditional software engineering development teams are familiar with.

BRIEF DESCRIPTION OF DRAWINGS

Various embodiments in accordance with the present disclosure will be described with reference to the drawings, in which.

DETAILED DESCRIPTION

Figure 1:
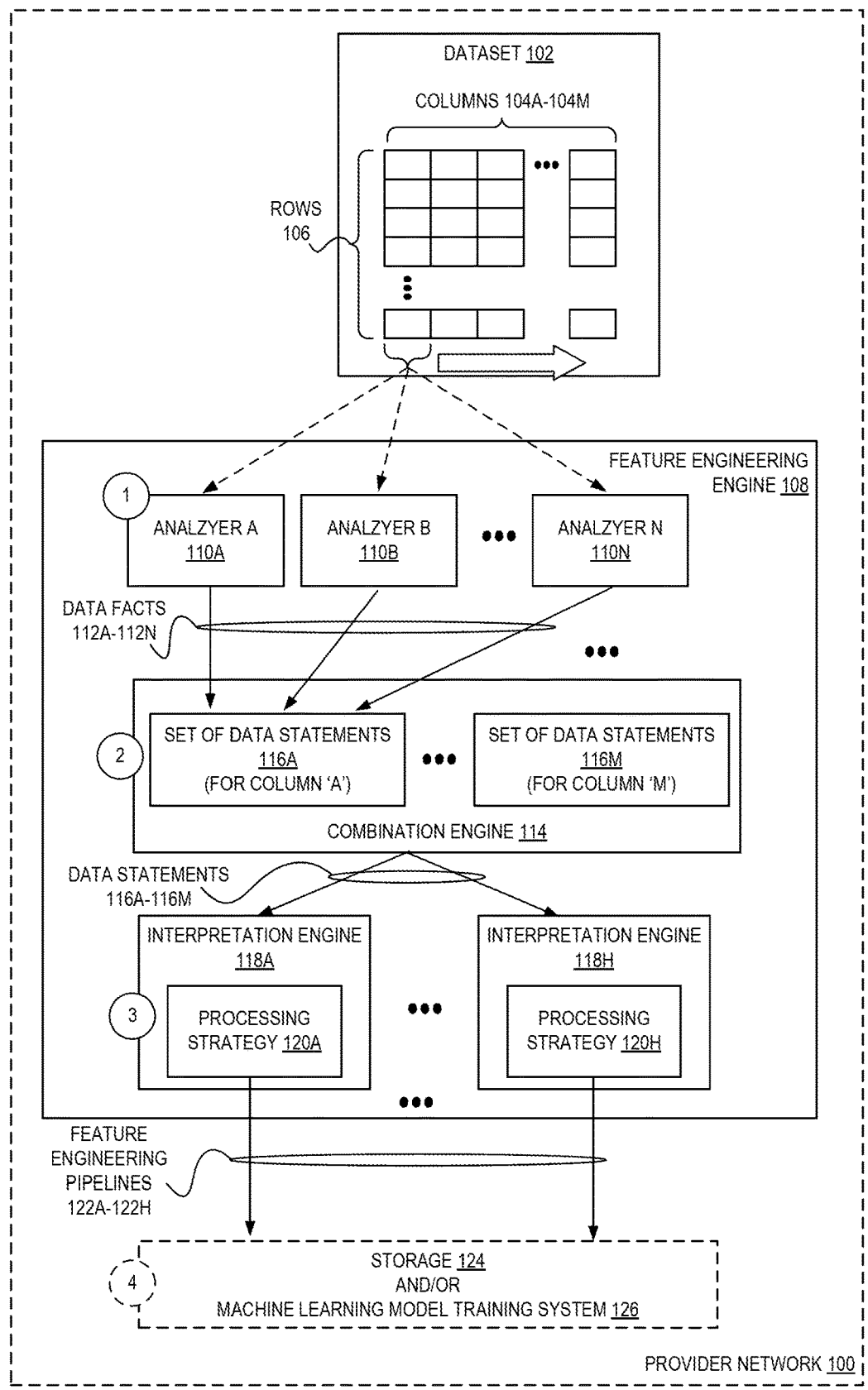
FIG. 1 is a diagram illustrating an environment for feature engineering pipeline generation for machine learning using decoupled dataset analysis and interpretation according to some embodiments.

The present disclosure relates to methods, apparatus, systems, and non-transitory computer-readable storage media for feature engineering pipeline generation for machine learning (ML) using decoupled dataset analysis and interpretation. According to some embodiments, a feature engineering engine utilizes multiple analyzers to produce different sets of data facts describing the values of each column in a dataset. The sets of data facts can be combined into sets of data statements and utilized by multiple interpretation engines to, according to different processing strategies, generate different feature engineering pipelines that specify operations for generating feature sets that can be used for training ML models.

In some embodiments, ones of the feature engineering pipelines can be provided to users, who may select a preferred feature engineering pipeline for use or further modify the feature engineering pipelines according to user-knowledge for further customization.

In some embodiments, the multiple feature engineering pipelines can be used to generate different feature sets, and these different feature sets can be used to train different ML model variants. In some embodiments, data (e.g., model accuracies) describing ones of the different ML model variants can be presented to a user, allowing the user to select a preferred ML model for download or deployment.

One of many challenges in utilizing ML techniques involves acquiring proper training data that can be used to train ML models. For example, typically a relatively large amount of data needs to be obtained that can learned from by a ML algorithm when constructing a model.

In order for such a ML model to work well, however, it is fundamentally important that this training data is complete and correct. In practice, high-quality consistent data is not often available, so much effort is typically required to cleanse and "fix" this data before it can be used for model training.

As one example, determining how to treat columns of data is an important problem in ML. Often, the data in a column may be dirty in that it may have missing values, invalid values, or other outliers. Additionally, or alternatively, the data in the column may be ambiguous and thus its meaning may not be readily apparent. For example, a column having a value "20191101" could store representations of a date (e.g., in a YYYYMMDD type format), a number, a product identifier, a phone number, or the like.

Furthermore, many types of data captured by organizations or other entities is typically not in a helpful format that can be used by ML models. For example, a column storing individual prices of products may not be fully grasped by a ML algorithm due to many non-repetitive values in the column; however, if the values were categorized into discrete categories (e.g., less than one-hundred dollars, between one-hundred and five-hundred dollars, or more than five-hundred dollars), many ML algorithms can learn via such categories much better.

Accordingly, in many scenarios to deploy ML techniques data scientists are utilized to do feature engineering—e.g., take raw, dirty data fields (product descriptions, product IDs, numbers such as price or part numbers or phone numbers, etc.) from datasets represented as spreadsheets or text files and apply various feature transformations to the data to make it something that is usable for the ML process. Feature engineering is a process of using domain knowledge of the data to create features (or feature sets) that make ML algorithms work. When done correctly, feature engineering increases the predictive power of ML algorithms by creating features from raw datasets that help facilitate the machine learning process.

Throughout this process, data scientists need to make many choices along the way. Typically, data scientists themselves need to make these choices based on intuition, based on values they see in the column, or a name of a column ("phone number", "price", etc.). For example, with a phone number, the typical useful information might be the area code, so a data scientist may need to extract that portion of the data as a category that a model might learn from. However, with a column of price values, the data scientist might need to apply a feature transformation to normalize it—e.g., instead of the column including prices between zero and one million, the values may be transformed to lie within a range such as [−1,1], etc., which is far more easily understood by certain classes of ML algorithms.

Thus, there are many ways to identify what is in a data column. Many organizations use schemas, at a basic level, that indicate how the data is stored on disk or in a database—e.g., a first column is a number, a second column is text data, a third column is an integer or decimal, a fourth column is a datetime, and so on. However, these fixed categories and quite generic and do not truly indicate what precise types of content may be stored in column.

Embodiments disclosed herein provide a flexible and powerful way to analyze datasets to determine how to transform the data into useful feature sets that can be used to train high-quality ML models.

FIG. 1 is a diagram illustrating an environment for feature engineering pipeline generation using decoupled dataset analysis and interpretation for ML according to some embodiments. FIG. 1 shows a feature engineering engine 108 that can be implemented as software, hardware, or a combination of both using one or multiple computing devices. In some embodiments, the feature engineering engine 108 is implemented within a multi-tenant provider network 100.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks (e.g., the internet) via one or more interface(s), such as through use of application programming interface (API) calls, via a console implemented as a website or application, etc. The interface(s) may be part of, or serve as a front-end to, a control plane of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute instance, such as a virtual machine, container, etc., when triggered or invoked. In some embodiments, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time. For example, ones or all of the analyzers 110, combination engine 114, interpretation engines 118, etc., of FIG. 1 may be implemented as serverless functions.

As shown in FIG. 1, a columnar dataset 102 includes rows 106 (or entries) of data values, where the data values may be arranged in one or more columns 104A-104M and may be of a same datatype or different datatypes. In some cases, the dataset 102 may include headings or other metadata describing names or datatypes of the columns, though in many cases this data may not exist. For example, the dataset may have been provided by a user as a plaintext file (e.g., a comma-separated values (CSV) or tab-separated values (TSV) file), an exported database table or structure, an application-specific file such as a spreadsheet, etc.

With such a dataset 102, a feature engineering engine 108 can analyze the dataset 102 using multiple analyzers 110A-110N and separately interpret the results of the analysis using multiple interpretation engines 118A-118H to generate multiple candidate feature engineering pipelines 122A-122H each indicating operations for how the dataset 102 can be transformed into a feature useful for machine learning. Accordingly, embodiments decouple the analysis of the data from the interpretation of the data, allowing multiple interpretations to be efficiently applied by the same or different downstream processes, e.g., one process might use sophisticated types like phone numbers, while another may use a very basic set of types like string or integer, for example.

The analyzers 110A-110N may initially examine the values of the dataset 102 as all being of a same primitive type—e.g., as string values—even if the values are labeled as being of another type (e.g., integer). In some embodiments, the analyzers 110A-110N may thus operate on a column-by-column basis to generate facts describing (or otherwise being associated with) the values of each column of the dataset 102 at circle (1). These facts may be objectively true facts that describe the values of a column, which may include "general" facts such as a count of missing or non-missing values in the column, how many unique values (i.e., the cardinality) exist in the column, and so on. Additionally, the facts may pertain to the meaning of the values of the column, such as a count of how many values could be parsed as a particular data type—e.g., float, integer, datetime, and so on. By way of example, the data facts may indicate that, for a particular column including 100 values, 50 of the values match a pattern known to be of a phone number type, 99 of the values match an integer type, and 1 of the values was a text string.

Each of the analyzers 110A-110N may be adapted to generate different types of data facts 112A-112N. For example, one analyzer 110A may generate "generic" facts which may be related to the interpretation of the data values as being strings, such as determining a maximum length of a value of the column, a minimum length of a value of the column, an average length of a value of the column, a cardinality of values of the column (i.e., a number of unique values), a count of any empty string values that exist, a count of values having non-ASCII characters, a count of values containing non-Latin characters, a 99% percentile of the length of the values, etc. Alternatively, or additionally, an analyzer may generate "generic" facts which may be related to the interpretation of the data values as being numeric values, e.g., a number of values that are negative numbers, a number of values that are positive numbers, a number of values that are integers or floats or etc., a cardinality of the values, a number of continuous values, etc.

As another example, another analyzer (e.g., analyzer 'B' 110B) may be adapted to generate data facts related to whether the values include email addresses. For example, a number of data facts generated by this analyzer could include a number of values that appear to be email addresses, a number of distinct domain names, a number of distinct domain suffixes, an email address cardinality value (which may be different than a pure cardinality, as the analyzer has knowledge of the semantic meaning of an email address, and thus whitespaces may be ignored), distribution/histogram type facts (e.g., any value that appears a threshold number of times, the top X appearing values), etc.

As other examples, other analyzers 110 may be implemented that identify data facts pertaining to different types of data, such as data facts involving some type of unique identifiers, or data facts involving data formats such as JavaScript Object Notation (JSON) or eXtensible Markup Language (XML)—e.g., a number of values that are proper XML or JSON, a statistical number of attributes per XML-adherent value, a statistical number of elements per XML-adherent value, statistical number of objects per JSON-adherent value etc. As another example, analyzers 110 may be implemented that identify data facts pertaining to date/time values, e.g., how many values look like a date, how many values look like a datetime, how many values look like a time stamp, what is the earliest represented date, what is the latest represented date, a statistical number (e.g., median, P99, etc.) related to the date or time or datetimes represented, etc.

As yet other examples, analyzers 110 may be implemented that identify data facts pertaining to phone numbers, URLs and/or URIs, address information, or many other types of subject matter that may be represented within data sets in a particular context. In some embodiments, end users may select which ones of the analyzers 110 are to be used for a particular job, for example, based on domain knowledge to eliminate unnecessary analysis (and thus reduce resource utilization), control costs, etc.

The data facts 112A-112N generated by the set of analyzers 110 for each of the one or more columns 104A-104M may be provided to a combination engine 114, which generates a set of data statements 116A-116M for each column at circle (2). For example, the combination engine 114 may consolidate all data facts 112 that it receives pertaining to a particular column 104A into a first set of data statements 116A, and consolidate all data facts 112 that it receives pertaining to a next particular column 104B into a second set of data statements 116B, and so on, until a set of data statements 116 for each column is created.

The data statements 116A-116M may then be provided to multiple interpretation engines 118A-118H at circle (3), which each may process the data statements 116A-116M according to a corresponding processing strategy 120A-120H that may be specific to a particular type of application to yield a corresponding feature engineering pipelines 122A-122H. A feature engineering pipeline may include code or commands that can be used to process a dataset to generate a set of features, or a set of identifiers of these operations.

Notably, the processing of the data statements 116A-116M—which are condensed representations of the dataset—by the interpretation engines 118 is much more efficient than a naive approach of interpreting the data by scanning through a full dataset 102 due to the data statements 116A-116M being significantly smaller in size compared to the dataset 102. This is particularly important with large datasets, and/or large numbers of processing strategies 120 involved.

Embodiments may thus implement a variety of processing strategies 120A-120H to apply different strategies for feature set generation. For example, a first processing strategy 120A may implement the following logic: if, according to the data statements, a column is at least 50% phone numbers, then drop every other value in the column that is not a phone number, and treat the column as including phone number data values. As another example, another processing strategy could implement relatively simple logic where if at least 99% of values of a column are of a particular type (e.g., integers), the column is treated as that type (e.g., integers) and any remaining non-integers are dropped. Accordingly, the interpretation of what the data is is separated from the initial analysis phase, and as a result the multiple interpretation engines 118 do not come up with one fixed schema, but instead it is up to another downstream component to determine what is semantically meaningful and thus to select their own schema and apply it in a meaningful way.

In some embodiments, the processing strategies may be substantially more complex. For example, a processing strategy may be implemented as logic with various fallback positions. As one specific use case, a processing strategy 120 may seek to treat certain data values in special way, such as phone numbers. Thus, the processing strategy 120 may use a number of heuristics, such as determining whether a first threshold number (e.g., 80%) of values appear to be phone numbers (while a second threshold number (e.g., 95%) of the values appear to be numbers), the column may be treated as phone numbers, though if the first threshold is not met while the second threshold continues to be met, the column may be treated as numeric.

In some embodiments, a more sophisticated processing strategy may include treating a same column two different ways if it is ambiguous. For example, if the data values are dirty and 40% of the values are valid email addresses and 40% are valid URLs, the strategy may have logic to split the column into two features—one for email addresses, and another for URLs.

Further, a processing strategy may include transforming the values of a column. For example, if a column includes a threshold number of valid email address values, but that the cardinality reveals that there are only five distinct email addresses, the strategy may indicate that the email addresses are to be trimmed down to only including domain names, though the strategy may also (or alternatively) indicate that the values are to be converted into a more simple categorical value (e.g., between 1 and 5). Thusly, different interpreters can interpret the data statements differently.

As another example of transforming values, as many ML algorithms are unable to use textual features for learning and instead rely on numerics (e.g., via decision trees), a processing strategy 120 may encode text values into numeric values. For example, a processing strategy 120 may generate a feature engineering pipeline to include performing one-hot encoding (or 1HE), which may include creating a new feature/column for different unique values within the values of the column, and inserting a 0 into a new column for a record not having that unique value within the original column and a 1 into the new column for a record that does have that unique value within the original column. By way of example, a column having only the values cat, dog, and other may result in a one-hot encoding with three new columns: animaltype=cat (with 0 or 1 values), animaltype=dog, and animaltype=other.

A processing strategy 120 may also create a feature engineering pipeline including the use of n-grams, which slice up textual data values into chunks (e.g., of 3 characters) and performing a one-hot encoding using the counts of the n-grams. Other types of operations may also be included within feature engineering pipelines, such as the use of deep neural networks (e.g., which take in a character at a time of each value and produce a numeric encoding such that two similar phrases or sentences are "close by" in a higher dimensional space whereas dissimilar ones are "far away" from each other), normalizing values of the column, imputing values of the column, simply dropping a column (e.g., when a column is empty most of time, or has same value everywhere but only a very minimal number of rows have a different value), applying a dimensionality reduction technique such as principal component analysis (PCA) to remove some columns from a feature set, which can be beneficial in that some ML algorithms work well with approximately one thousand or fewer features, so dimensionality reduction can be used to compress the feature set to ensure high-quality ML.

Optionally, at circle (4) one or more of the feature engineering pipelines may be stored to a storage location 124 (e.g., of a storage service of the provider network 100, allowing ones or all of the feature engineering pipelines to be downloaded by a user) and/or directly sent to a user and/or used to construct feature sets and thereafter train one or more machine learning models via a ML model training system 126.

For example, in some embodiments the feature engineering pipelines 122A-122H are used to generate corresponding feature sets that are used to train different machine learning model variants. The resulting models may be analyzed—such as by examining the resultant accuracies of the models—and a "best" performing model could be deployed for use, and/or one or more of feature engineering pipelines 122A-122H (and associated machine learning models) can be presented to a user, allowing the user to download the model, download and/or customize the feature engineering pipelines. Users may have expert domain knowledge and be able to further customize a feature engineering pipeline to improve the feature sets it generates. As an example, for a user working at a bank, columns from the input dataset (e.g., debt value, income value) may be treated generically within the feature engineering pipeline, but the user might know that debt-to-income ratios are very important, and the user may be able to modify the feature engineering pipeline to add in a feature for this value. Thus, the user may take the feature engineering pipeline code (and/or the associated machine learning algorithm and/or model) and use it as-is or customize/extend it further.

Figure 2:
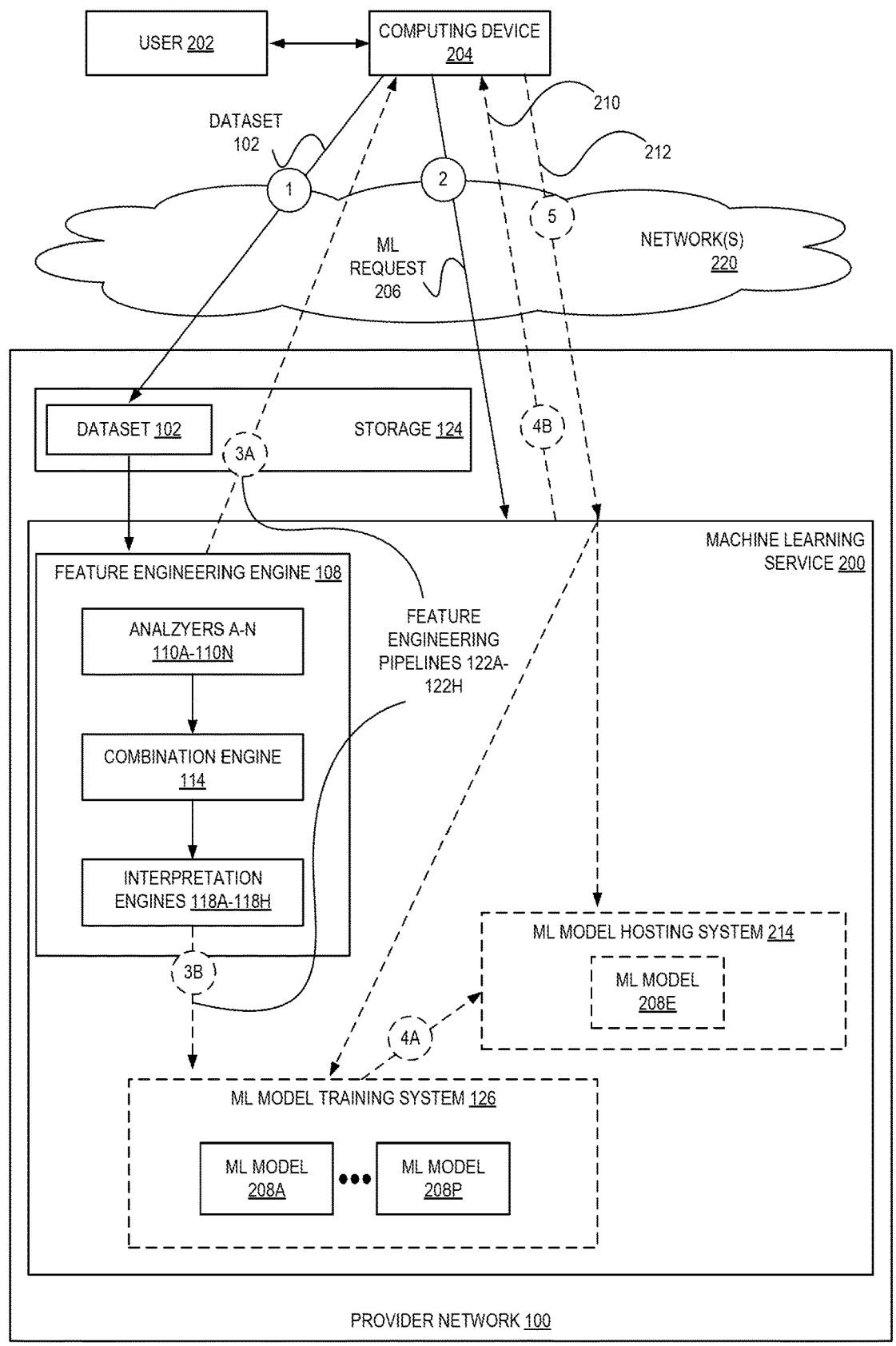
FIG. 2 is a diagram illustrating a multi-tenant provider network environment for feature engineering pipeline generation for machine learning using decoupled dataset analysis and interpretation according to some embodiments.

FIG. 2 is a diagram illustrating a multi-tenant provider network environment for feature engineering pipeline generation for machine learning using decoupled dataset analysis and interpretation according to some embodiments. As shown, a user 202 may utilize a client executed by a computing device 204, e.g., to upload a dataset 102 to a storage 124 location of the provider network at circle (1), and send a machine learning request 206 at circle (2) to a machine learning service 200 (that includes the feature engineering engine 108) to request that one or more feature processing pipelines be generated based on the dataset 102. The request may include an identifier of the dataset 102, which may include an identifier of a storage location (e.g., a folder or bucket or account) where the dataset 102 may be obtained. The feature engineering engine 108 may obtain the dataset from the storage 124 location and perform the operations described herein via the analyzers 110A-110N, combination engine 114, and interpretation engines 118 to generate feature engineering pipelines 122A-122H.

Optionally, as shown at circle (3A), the feature engineering engine 108 may output the feature engineering pipelines 122 to a storage 124 location or may transmit one or more of the feature engineering pipelines (e.g., along with descriptive data) to the computing device 204 of the user 202. Alternatively, or additionally, the feature engineering engine 108 at circle (3B) may send the feature engineering pipelines 122 to a ML model training system 126, which may use the feature engineering pipelines 122 to generate feature sets and use these feature sets to train ML models 208A-208P.

One or more of the resultant ML models 208A-208P (e.g., ML model 208E) may be deployed at optional circle (4A) via a ML model hosting system 214 (e.g., behind an endpoint configured to send inference requests issued by clients on to the ML model for inference and return the result back to the clients). Alternatively, or additionally, at circle (4B) the machine learning service 200 may send one or more of the ML models 208A-208P and/or one or more of the corresponding feature engineering pipelines 122, optionally with metadata describing the accuracy of the models, to the computing device 204 as message(s) 210. Optionally, the user 202 may select one (or more) of the models 208 to be deployed via the computing device 204, causing the transmission of a message 212 at optional circle (5) to the machine learning service 200 instructing the service to host a particular model (e.g., ML model 208E) or models. Alternatively, the user 202 may select (and/or modify) a feature engineering pipeline 122 to be used to train a ML model, causing a message 212 to be sent at optional circle (5) to the machine learning service 200 instructing the service to train a model via use of the feature engineering pipeline 122 or data sets generated using a feature engineering pipeline 122.

Figure 3:
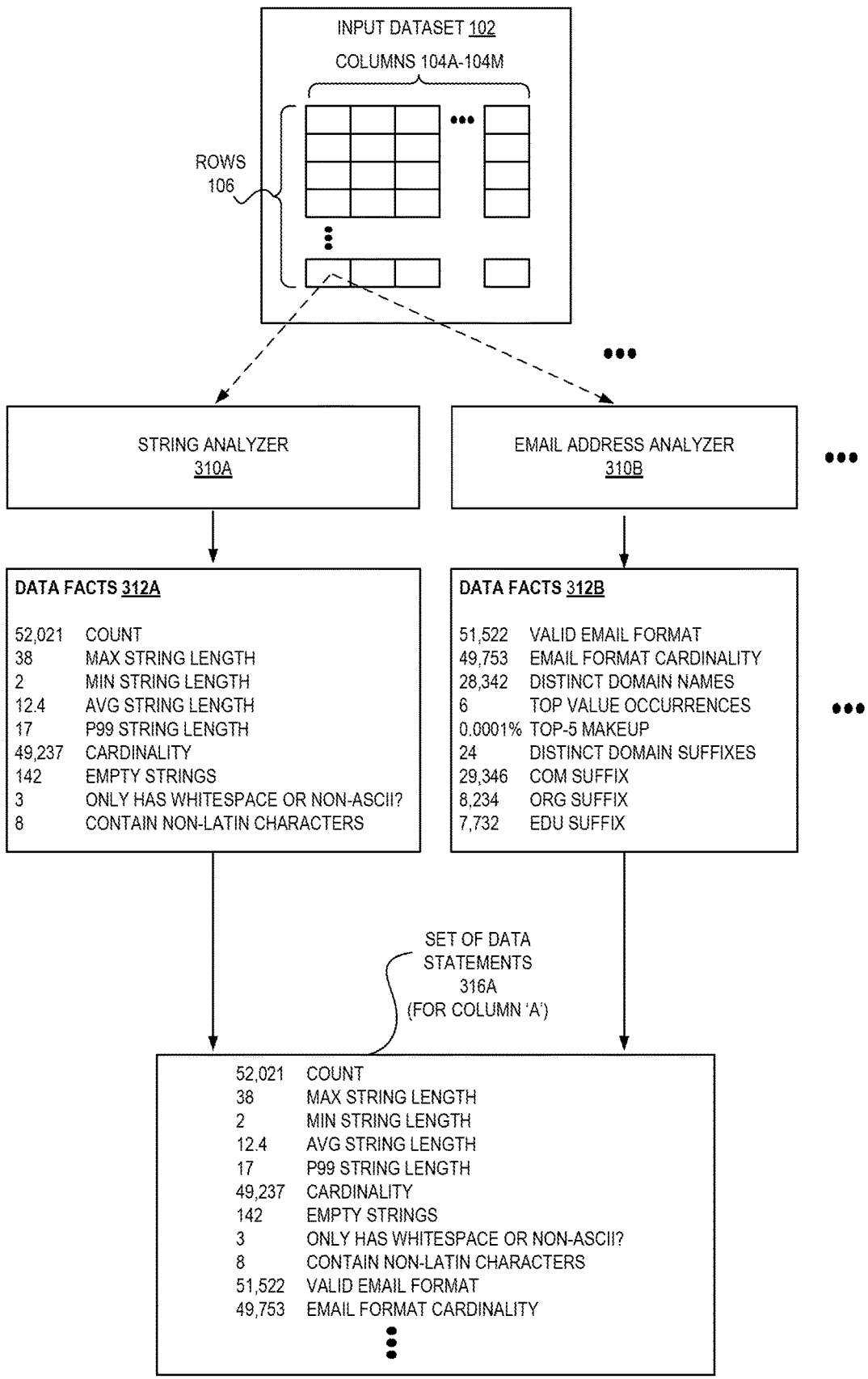
FIG. 3 is a diagram illustrating exemplary dataset analysis and data fact generation operations according to some embodiments.

FIG. 3 is a diagram illustrating exemplary dataset analysis and data fact generation operations according to some embodiments. As indicated herein, a dataset 102 may be processed by multiple analyzers 110—here, a first string analyzer 310A is shown as processing a first column of the dataset to generate a set of data facts 312A, including a count of the values, statistical values (maximum, minimum, average, P99) of the string length, a cardinality, a number of empty strings, a number of strings only having whitespace or non-ASCII characters, a number of strings including non-Latin characters, etc.

Similarly, another analyzer is shown—an email address analyzer 310B— that processes the column to generate data facts 312B, including a number of values that have a valid email format, the cardinality of the email addresses, a number of distinct domain names, a number of occurrences of a top-appearing email address, a percentage of the overall column values that the top 5 appearing values make up, a number of distinct domain suffixes, a number of .COM or .ORG or .EDU suffixes, etc.

Of note, each of these analyzers 310 may generate data facts for each of the columns of the dataset, and other analyzers may also be implemented as well.

Based on the individual data facts 312A-312B, a consolidated set of data statements 316A for the first column can be generated (e.g., by aggregating/combining some or all of the data facts 312A-312B) and ultimately used by the interpretation engines 118 as described elsewhere.

Figure 4:
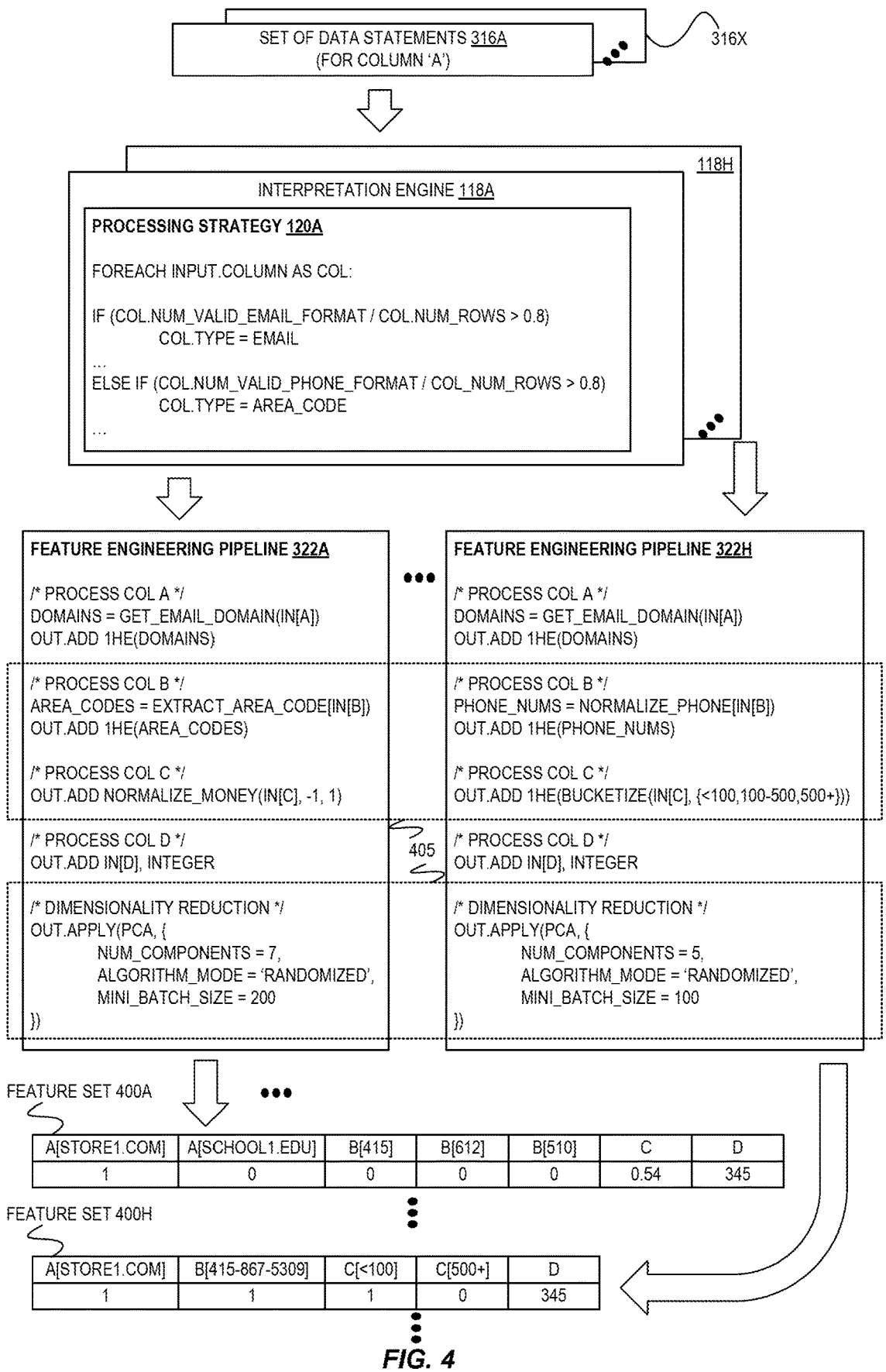
FIG. 4 is a diagram illustrating an exemplary interpretation of data facts to generate feature engineering pipelines and an exemplary feature set according to some embodiments.

FIG. 4 is a diagram illustrating an exemplary interpretation of data facts to generate feature engineering pipelines and exemplary feature sets according to some embodiments. In this example, a number of data statements 316A-316X corresponding to the columns of the dataset may be utilized by each of a plurality of interpretation engines 118A-118H which, according to their corresponding processing strategies 120, generate feature engineering pipelines 322—two of which are shown as pipelines 322A, 322H.

A portion of an exemplary processing strategy 120A is shown, which in this example includes a number of conditional statements specifying how columns of data should be treated based on various ones of the sets of data statements and characteristics of the dataset. For example, a first conditional statement indicates that if a percentage of the values in a column adhere to an "email address" type format (e.g., greater than eighty percent), then the column should be treated as storing email addresses. Such conditional statements can be crafted in different manners to create different feature engineering pipelines and thus, different feature sets, in order to allow different types of features to be generated and ultimately used to train different machine learning models. Using these processing strategies 120, the interpretation engines 118 can generate feature engineering pipelines 322 that can be used to transform data into feature sets.

For example, the first feature engineering pipeline 322A indicates that from the values of the first column A, email domains are to be obtained and one-hot encoded into multiple columns in the feature set. Similarly, to process the values of a second column B, area codes are extracted and one-hot encoded into multiple columns, and for a third column C, the values are to be treated as monetary values and normalized between −1 and 1. For a fourth column D, the values are to be processed as integers. Finally, a dimensionality reduction process is to be performed—here, PCA—according to a set of provided hyperparameters.

This exemplary feature engineering pipeline 322A, upon execution upon a dataset, may result in the following feature set 400A—two columns related to one-hot encoded email domains (where the corresponding value includes the domain "store1.com"), three columns related to one-hot encoded area codes, one column of a normalized price of "0.54", and finally a column including an integer of "345."

Each other interpretation engine 118B-118H may implement different processing strategies 120B-120H, leading to the generation of different feature engineering pipelines 322B-322H and thus, different feature sets 400B-400H.

Figure 5:
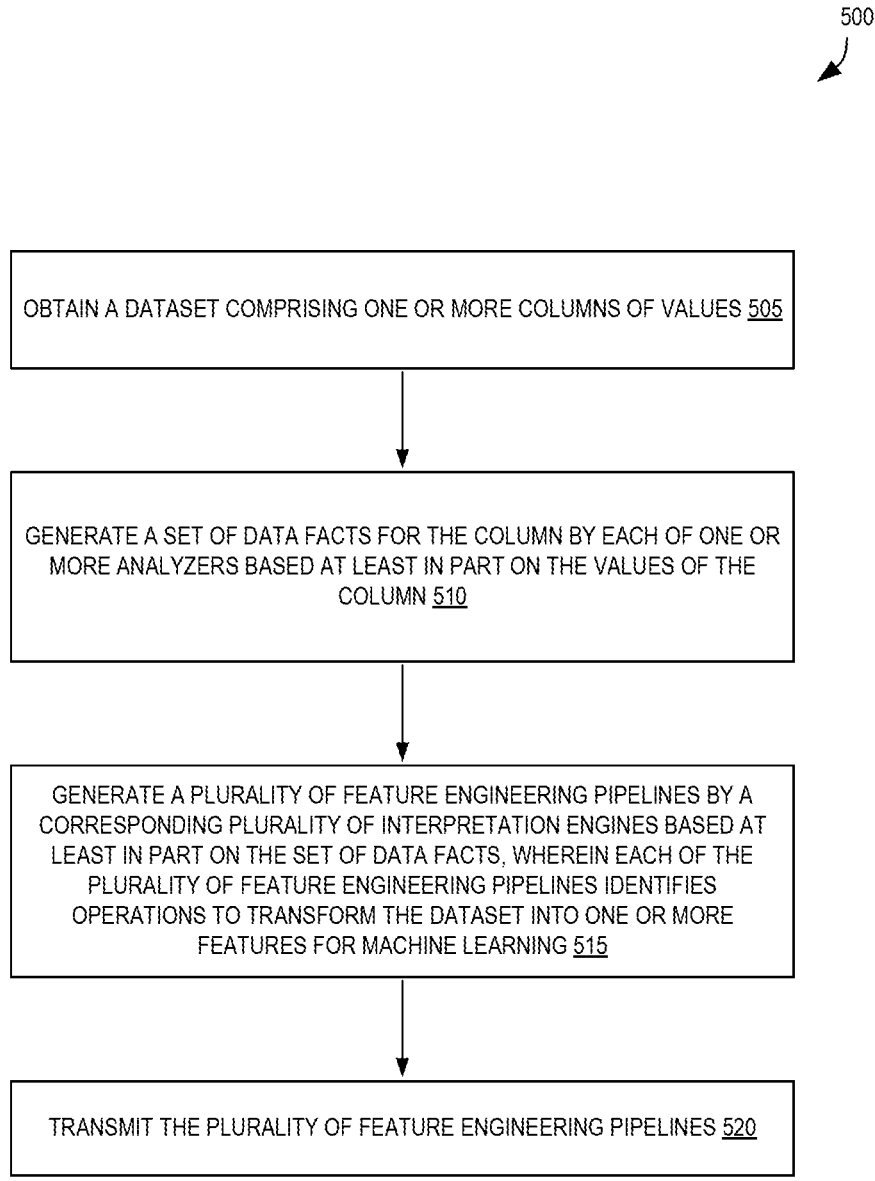
FIG. 5 is a flow diagram illustrating operations of a method for feature engineering pipeline generation using decoupled dataset analysis and interpretation according to some embodiments.

FIG. 5 is a flow diagram illustrating operations 500 of a method for feature engineering pipeline generation using decoupled dataset analysis and interpretation according to some embodiments. Some or all of the operations 500 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 500 are performed by the feature engineering engine 108 and/or machine learning service 200 of the other figures.

The operations 500 include, at block 505, obtaining a dataset comprising one or more columns (e.g., a plurality of columns) of values.

The operations 500 further include, at block 510, generating a set of data facts (e.g., a plurality of sets of data facts) for each of the one or more columns by one or more analyzers (e.g., a plurality of analyzers), wherein the set of data facts (e.g., each of the plurality of sets of data facts) for the column is generated based at least in part on the values of the column.

In some embodiments, block 510 includes generating a plurality of sets of data facts by a plurality of analyzers, and each of the plurality of analyzers generates a same type of data facts for each of the plurality of columns. In some embodiments, the plurality of analyzers includes: a string analyzer, an email address analyzer; a unique identifier analyzer; a hierarchical data format analyzer; a datetime analyzer; a phone number analyzer; an address analyzer; a numeric analyzer; or any combination thereof.

The operations 500 further include, at block 515, generating a plurality of feature engineering pipelines by a plurality of interpretation engines based at least in part on the set of facts (e.g., the plurality of sets of data facts), wherein each of the plurality of feature engineering pipelines identifies operations to transform the dataset into one or more (e.g., a plurality of) features for machine learning.

In some embodiments, at least one of the plurality of feature engineering pipelines specifies that values from or derived from a column (e.g., one of a plurality of columns) are to be one-hot encoded.

In some embodiments, block 510 includes generating a plurality of sets of data facts and the operations further include combining the plurality of sets of data facts into a set of data statements, where the plurality of interpretation engines utilize the set of data statements but not the dataset to generate the plurality of feature engineering pipelines.

In some embodiments, each of the plurality of interpretation engines implements a different processing strategy.

In some embodiments, at least one of the plurality of feature engineering pipelines specifies that a dimensionality reduction algorithm is to be executed, that values of a column are to be normalized, that values of a column are to be imputed, or that a column is to be dropped.

In some embodiments, at least one of the plurality of feature engineering pipelines specifies that a feature set is to be generated having more columns than a number of the columns of the dataset.

At block 520, the operations 500 further include transmitting the plurality of feature engineering pipelines. In some embodiments, transmitting the plurality of feature engineering pipelines comprises transmitting code for generating one or more (e.g., the plurality of) features to a computing device of a user.

In some embodiments, the operations further include training a plurality of machine learning (ML) models using the plurality of feature engineering pipelines.

In some embodiments, the operations further include determining a best-performing ML model of the plurality of ML models; and sending a message to a computing device of a user that identifies the best-performing ML model or deploying the best-performing ML model for inference.

The split analysis and interpretation techniques disclosed herein may also be applied in other environments for other benefits.

As one example, these techniques can be used for monitoring the use of a ML model in a production environment. For example, after using this disclosed system to analyze a dataset and train a model, an interpreter can be created and run on a periodic basis (e.g., once a day or week) to generate additional data statements to determine whether the model is still good by, for example, determining whether the dataset still looks similar to the one used to create the model.

As another example, these techniques can be applied outside the realm of ML for data cleaning by detecting outliers. For example, multiple analyzers can be crafted that are run against dirty data to identify where there are missing values or problems, e.g., by finding "placeholder" values that should not exist, such as a "NULL" token instead of a name. As an example, one of the data statements might identify "heavy hitter" values, e.g., that appear more than a threshold number of times, and an interpreter may be used for data cleaning purposes, for example, by dropping these values.

As another example, these techniques can be applied for data ingestion or importing purposes. As databases may have some information based on the datatype of a column—e.g., is it a string or a number—but the richer data statements (that may be statistical/probabilistic in nature) can be used to flag invalid or anomalous entries. For example, a set of data statements may reveal that only positive values have been seen in a column, which can be used to generate a rule indicating that if a negative value is observed, it is to be flagged or rejected. Other types of data statements and rules can be straightforwardly implemented, such as detecting the use of new values, detecting a value outside of a certain observed range, etc.

Figure 6:
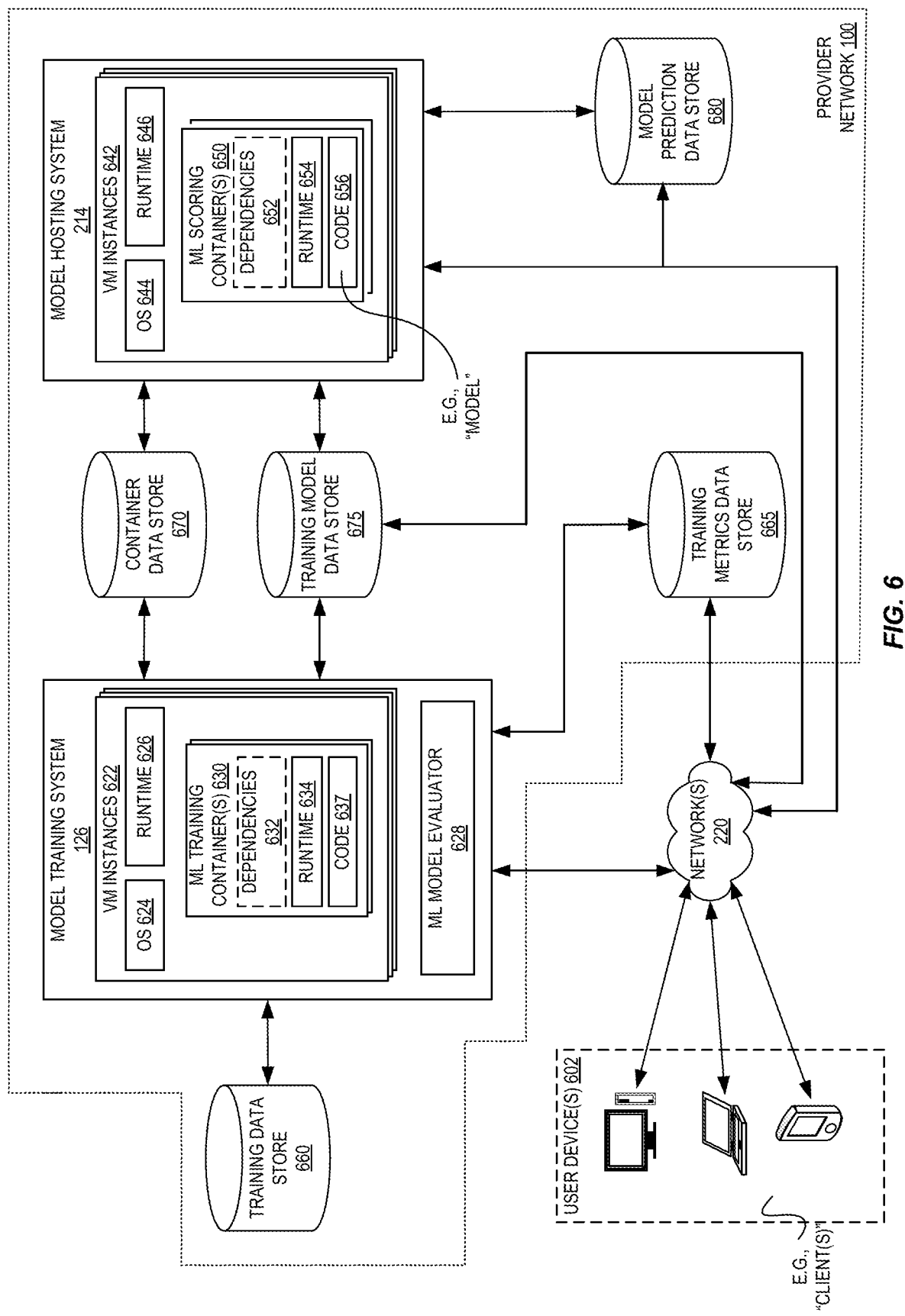
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (e.g., a PC or mobile device such as computing device 204), a model training system 126, a model hosting system 214, a training data store 660, a training metrics data store 665, a container data store 670, a training model data store 675, and a model prediction data store 680. A machine learning service 200 described herein may include one or more of these entities, such as the model hosting system 214, model training system 126, etc.

In some embodiments, users, by way of user devices 602, interact with the model training system 126 to provide data that causes the model training system 126 to train one or more machine learning models. A machine learning model, generally, may be thought of as one or more equations that are "trained" using a set of data. In some embodiments, the model training system 126 provides ML functionalities as a Web service, and thus messaging between user devices 602 and the model training system 126 (or provider network 100), and/or between components of the model training system 126 (or provider network 100), may utilize HTTP messages to transfer data in a machine-readable file format, such as XML or JSON.

The user devices 602 can interact with the model training system 126 via frontend 629 of the model training system 126. For example, a user device 602 can provide a training request to the frontend 629 that includes a container image (or multiple container images, or an identifier of one or multiple locations where container images are stored), an indicator of input data (e.g., an address or location of input data), one or more hyperparameter values (e.g., values indicating how the algorithm will operate, how many algorithms to run in parallel, how many clusters into which to separate data, etc.), and/or information describing the computing machine on which to train a machine learning model (e.g., a graphical processing unit (GPU) instance type, a central processing unit (CPU) instance type, an amount of memory to allocate, a type of virtual machine instance to use for training, etc.).

In some embodiments, the container image can include one or more layers, where each layer represents an executable instruction. Some or all of the executable instructions together represent an algorithm that defines a machine learning model. The executable instructions (e.g., the algorithm) can be written in any programming language (e.g., Python, Ruby, C++, Java, etc.). In some embodiments, the algorithm is pre-generated and obtained by a user, via the user device 602, from an algorithm repository (e.g., a network-accessible marketplace, a data store provided by a machine learning training service, etc.). In some embodiments, the algorithm is completely user-generated or partially user-generated (e.g., user-provided code modifies or configures existing algorithmic code).

In some embodiments, instead of providing a container image (or identifier thereof) in the training request, the user device 602 may provide, in the training request, an algorithm written in any programming language. The model training system 126 packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (e.g., an interactive web-based programming environment) and cause the algorithm/code to be provided—perhaps as part of a training request (or referenced in a training request)—to the model training system 126, where this algorithm/code may be containerized on its own or used together with an existing container having a machine learning framework, for example.

In some embodiments, instead of providing a container image in the training request, the user device 602 provides, in the training request, an indicator of a container image (e.g., an indication of an address or a location at which a container image is stored). For example, the container image can be stored in a container data store 670, and this container image may have been previously created/uploaded by the user. The model training system 126 can retrieve the container image from the indicated location and create a container using the retrieved container image. The container is then loaded into a virtual machine instance 622 for training a machine learning model, as described in greater detail below.

The model training system 126 can use the information provided by the user device 602 to train a machine learning model in one or more pre-established virtual machine instances 622 in some embodiments. In particular, the model training system 126 includes a single physical computing device or multiple physical computing devices that are interconnected using one or more computing networks (not shown), where the physical computing device(s) host one or more virtual machine instances 622. The model training system 126 can handle the acquisition and configuration of compute capacity (e.g., containers, instances, etc., which are described in greater detail below) based on the information describing the computing machine on which to train a machine learning model provided by the user device 602. The model training system 126 can then train machine learning models using the compute capacity, as is described in greater detail below. The model training system 126 can automatically scale up and down based on the volume of training requests received from user devices 602 via frontend 629, thereby relieving the user from the burden of having to worry about over-utilization (e.g., acquiring too little computing resources and suffering performance issues) or under-utilization (e.g., acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (e.g., task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (e.g., creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (e.g., the executable instruction (s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (e.g., execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 126 uses one or more container images included in a training request (or a container image retrieved from the container data store 670 in response to a received training request) to create and initialize a ML training container 630 in a virtual machine instance 622. For example, the model training system 126 creates a ML training container 630 that includes the container image(s) and/or a top container layer.

Prior to beginning the training process, in some embodiments, the model training system 126 retrieves training data from the location indicated in the training request. For example, the location indicated in the training request can be a location in the training data store 660. Thus, the model training system 126 retrieves the training data from the indicated location in the training data store 660. In some embodiments, the model training system 126 does not retrieve the training data prior to beginning the training process. Rather, the model training system 126 streams the training data from the indicated location during the training process. For example, the model training system 126 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (e.g., a buffer storing the retrieved portion is nearly empty), then the model training system 126 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (e.g., coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 126 as input parameters to some or all of the instructions being executed.

In some embodiments, executing the executable instructions causes the virtual machine instance 622 (e.g., the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 126 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (e.g., one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (e.g., a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 126 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (e.g., information indicating that N ML training containers 630 are collectively training a machine learning model and that a particular ML training container 630 receiving the configuration information is ML training container 630 number X of N), which can be included in the resulting model data. By parallelizing the training process, the model training system 126 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 126 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 126 can further provide configuration information to each ML training container 630 via the virtual machine instances 622 (e.g., information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 126 can significantly reduce the training time in some embodiments.

In some embodiments, the model training system 126 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 126 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (e.g., a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (e.g., known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (e.g., the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (e.g., has an error rate above a threshold value, has a statistical distribution that is not an expected or desired distribution (e.g., not a binomial distribution, a Poisson distribution, a geometric distribution, a normal distribution, Gaussian distribution, etc.), has an execution latency above a threshold value, has a confidence level below a threshold value)) and/or is performing progressively worse (e.g., the quality metric continues to worsen over time). In response, in some embodiments, the user, via the user device 602, can transmit a request to the model training system 126 to modify the machine learning model being trained (e.g., transmit a modification request). The request can include a new or modified container image, a new or modified algorithm, new or modified hyperparameter(s), and/or new or modified information describing the computing machine on which to train a machine learning model. The model training system 126 can modify the machine learning model accordingly. For example, the model training system 126 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 126 can cause the virtual machine instance 622 to modify the execution of code stored in an existing ML training container 630 according to the data provided in the modification request. In some embodiments, the user, via the user device 602, can transmit a request to the model training system 126 to stop the machine learning model training process. The model training system 126 can then instruct the virtual machine instance 622 to delete the ML training container 630 and/or to delete any model data stored in the training model data store 675.

As described below, in some embodiments, the model data stored in the training model data store 675 is used by the model hosting system 214 to deploy machine learning models. Alternatively, or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (e.g., move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (e.g., rapid initialization of machine learning model training in ML training container(s) 630) in response to training requests.

In some embodiments, the model training system 126 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model hosting system 214, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 214 includes a single physical computing device or multiple physical computing devices that are interconnected using one or more computing networks (not shown), where the physical computing device(s) host one or more virtual machine instances 642. The model hosting system 214 can handle the acquisition and configuration of compute capacity (e.g., containers, instances, etc.) based on demand for the execution of trained machine learning models. The model hosting system 214 can then execute machine learning models using the compute capacity, as is described in greater detail below. The model hosting system 214 can automatically scale up and down based on the volume of execution requests received from user devices 602 via frontend 649 of the model hosting system 214, thereby relieving the user from the burden of having to worry about over-utilization (e.g., acquiring too little computing resources and suffering performance issues) or under-utilization (e.g., acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (e.g., task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (e.g., creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (e.g., supporting software such as libraries) needed by the code 656 in some embodiments. The runtime 654 can be defined by one or more executable instructions that form at least a portion of a container image that is used to form the ML scoring container 650 (e.g., the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (e.g., predicted or "inferred" results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 214 uses one or more container images included in a deployment request (or a container image retrieved from the container data store 670 in response to a received deployment request) to create and initialize a ML scoring container 650 in a virtual machine instance 642. For example, the model hosting system 214 creates a ML scoring container 650 that includes the container image(s) and/or a top container layer.

As described above, a user device 602 can submit a deployment request and/or an execution request to the model hosting system 214 via the frontend 649 in some embodiments. A deployment request causes the model hosting system 214 to deploy a trained machine learning model into a virtual machine instance 642. For example, the deployment request can include an identification of an endpoint (e.g., an endpoint name, such as an HTTP endpoint name) and an identification of one or more trained machine learning models (e.g., a location of one or more model data files stored in the training model data store 675). Optionally, the deployment request also includes an identification of one or more container images stored in the container data store 670.

Upon receiving the deployment request, the model hosting system 214 initializes ones or more ML scoring containers 650 in one or more hosted virtual machine instance 642. In embodiments in which the deployment request includes an identification of one or more container images, the model hosting system 214 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 214 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 214 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 214 retrieves the identified model data file from the training model data store 675 and inserts the model data file into a single ML scoring container 650, which forms a portion of code 656. In some embodiments, the model data file is archived or compressed (e.g., formed from a package of individual files). Thus, the model hosting system 214 unarchives or decompresses the model data file to obtain multiple individual files and inserts the individual files into the ML scoring container 650. In some embodiments, the model hosting system 214 stores the model data file in the same location as the location in which the model data file was stored in the ML training container 630 that generated the model data file. For example, the model data file initially was stored in the top container layer of the ML training container 630 at a certain offset, and the model hosting system 214 then stores the model data file in the top container layer of the ML scoring container 650 at the same offset.

In embodiments in which multiple model data files are identified in the deployment request, the model hosting system 214 retrieves the identified model data files from the training model data store 675. The model hosting system 214 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (e.g., the output of one trained machine learning model is used as an input to another trained machine learning model). Thus, the user may desire to deploy multiple machine learning models to eventually receive a single output that relies on the outputs of multiple machine learning models.

In some embodiments, the model hosting system 214 associates the initialized ML scoring container(s) 650 with the endpoint identified in the deployment request. For example, each of the initialized ML scoring container(s) 650 can be associated with a network address. The model hosting system 214 can map the network address(es) to the identified endpoint, and the model hosting system 214 or another system (e.g., a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 214 via the frontend 649, where the execution request identifies an endpoint and includes an input to a machine learning model (e.g., a set of input data). The model hosting system 214 or another system (e.g., a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 214 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (e.g., if no more trained machine learning models are needed to generate an output) or transmit the second output to a third ML scoring container 650 initialized in the same or different virtual machine instance 642 (e.g., if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (e.g., rapid initialization of ML scoring container(s) 650, rapid execution of code 656 in ML scoring container(s), etc.) in response to deployment and/or execution requests.

In some embodiments, the model hosting system 214 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (e.g., user devices 602, the model training system 126, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi-arm bandit models, reinforcement learning models, ensemble machine learning models, deep learning models, or the like.

The model training system 126 and the model hosting system 214 depicted in FIG. 6 are not meant to be limiting. For example, the model training system 126 and/or the model hosting system 214 could also operate within a computing environment having a fewer or greater number of devices than are illustrated in FIG. 6. Thus, the depiction of the model training system 126 and/or the model hosting system 214 in FIG. 6 may be taken as illustrative and not limiting to the present disclosure. For example, the model training system 126 and/or the model hosting system 214 or various constituents thereof could implement various Web services components, hosted or "cloud" computing environments, and/or peer-to-peer network configurations to implement at least a portion of the processes described herein. In some embodiments, the model training system 126 and/or the model hosting system 214 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 126. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 214. The frontend 649 processes the requests and makes sure that the requests are properly authorized. For example, the frontend 649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 126 and the model hosting system 214, this is not meant to be limiting. For example, in some embodiments not shown, the training data store 660 is located internal to at least one of the model training system 126 or the model hosting system 214.

In some embodiments, the training metrics data store 665 stores model metrics. While the training metrics data store 665 is depicted as being located external to the model training system 126 and the model hosting system 214, this is not meant to be limiting. For example, in some embodiments not shown, the training metrics data store 665 is located internal to at least one of the model training system 126 or the model hosting system 214.

The container data store 670 stores container images, such as container images used to form ML training containers 630 and/or ML scoring containers 650, that can be retrieved by various virtual machine instances 622 and/or 642. While the container data store 670 is depicted as being located external to the model training system 126 and the model hosting system 214, this is not meant to be limiting. For example, in some embodiments not shown, the container data store 670 is located internal to at least one of the model training system 126 and the model hosting system 214.

The training model data store 675 stores model data files. In some embodiments, some of the model data files are comprised of a single file, while other model data files are packages of multiple individual files. While the training model data store 675 is depicted as being located external to the model training system 126 and the model hosting system 214, this is not meant to be limiting. For example, in some embodiments not shown, the training model data store 675 is located internal to at least one of the model training system 126 or the model hosting system 214.

The model prediction data store 680 stores outputs (e.g., execution results) generated by the ML scoring containers 650 in some embodiments. While the model prediction data store 680 is depicted as being located external to the model training system 126 and the model hosting system 214, this is not meant to be limiting. For example, in some embodiments not shown, the model prediction data store 680 is located internal to at least one of the model training system 126 and the model hosting system 214.

While the model training system 126, the model hosting system 214, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (e.g., also referred to herein as a machine learning service) can communicate with one or more of the user devices 602 via the one or more network(s) 220.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set top box, voice command device, camera, digital media player, and the like. In some embodiments, the model training system 126 and/or the model hosting system 214 provides the user devices 602 with one or more user interfaces, command-line interfaces (CLI), application programing interfaces (API), and/or other programmatic interfaces for submitting training requests, deployment requests, and/or execution requests. In some embodiments, the user devices 602 can execute a stand-alone application that interacts with the model training system 126 and/or the model hosting system 214 for submitting training requests, deployment requests, and/or execution requests.

In some embodiments, the network 220 includes any wired network, wireless network, or combination thereof. For example, the network 220 may be a personal area network, local area network, wide area network, over-the-air broadcast network (e.g., for radio or television), cable network, satellite network, cellular telephone network, or combination thereof. As a further example, the network 220 may be a publicly accessible network of linked networks, possibly operated by various distinct parties, such as the Internet. In some embodiments, the network 220 may be a private or semi-private network, such as a corporate or university intranet. The network 220 may include one or more wireless networks, such as a Global System for Mobile Communications (GSM) network, a Code Division Multiple Access (CDMA) network, a Long Term Evolution (LTE) network, or any other type of wireless network. The network 220 can use protocols and components for communicating via the Internet or any of the other aforementioned types of networks. For example, the protocols used by the network 220 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
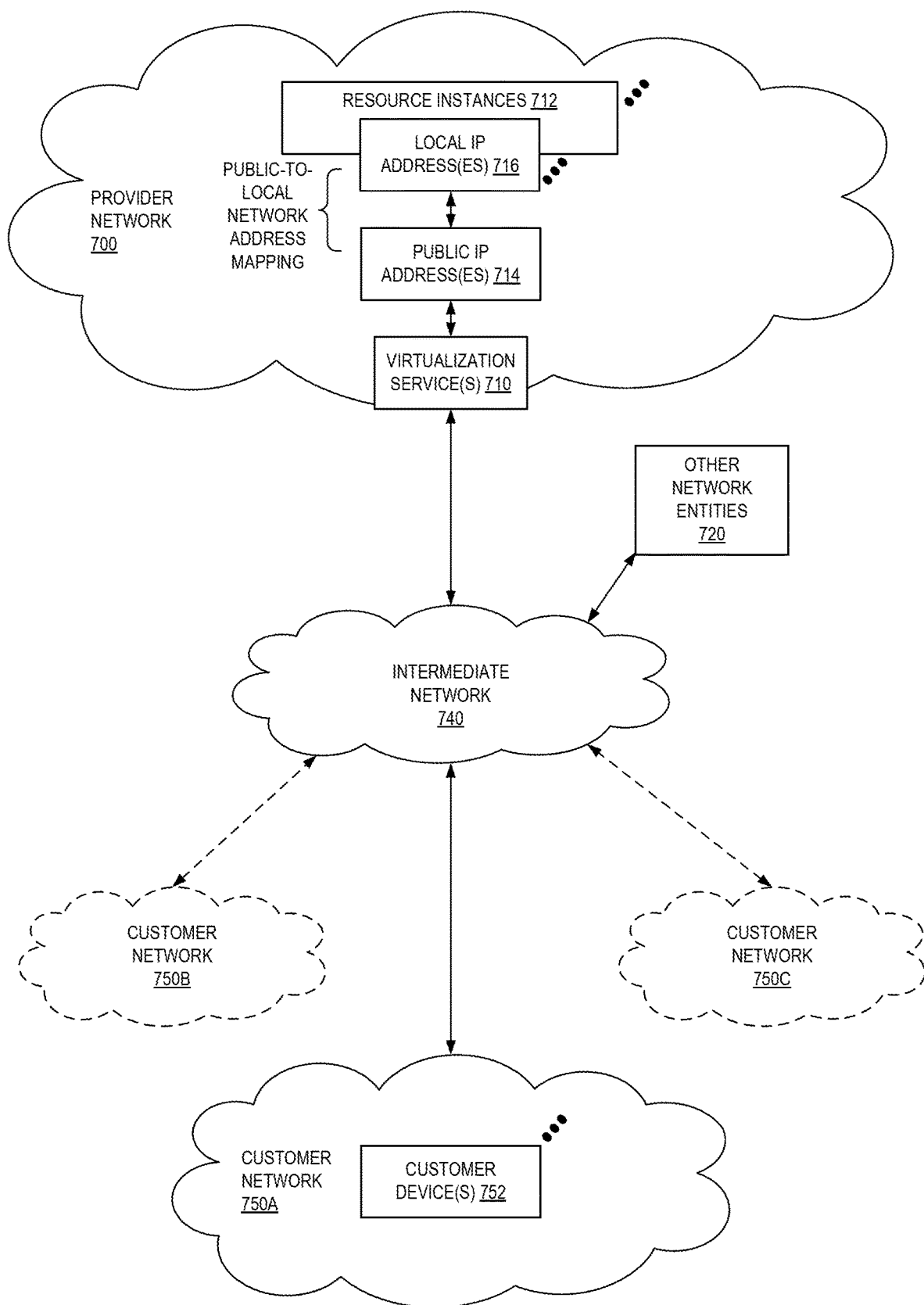
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
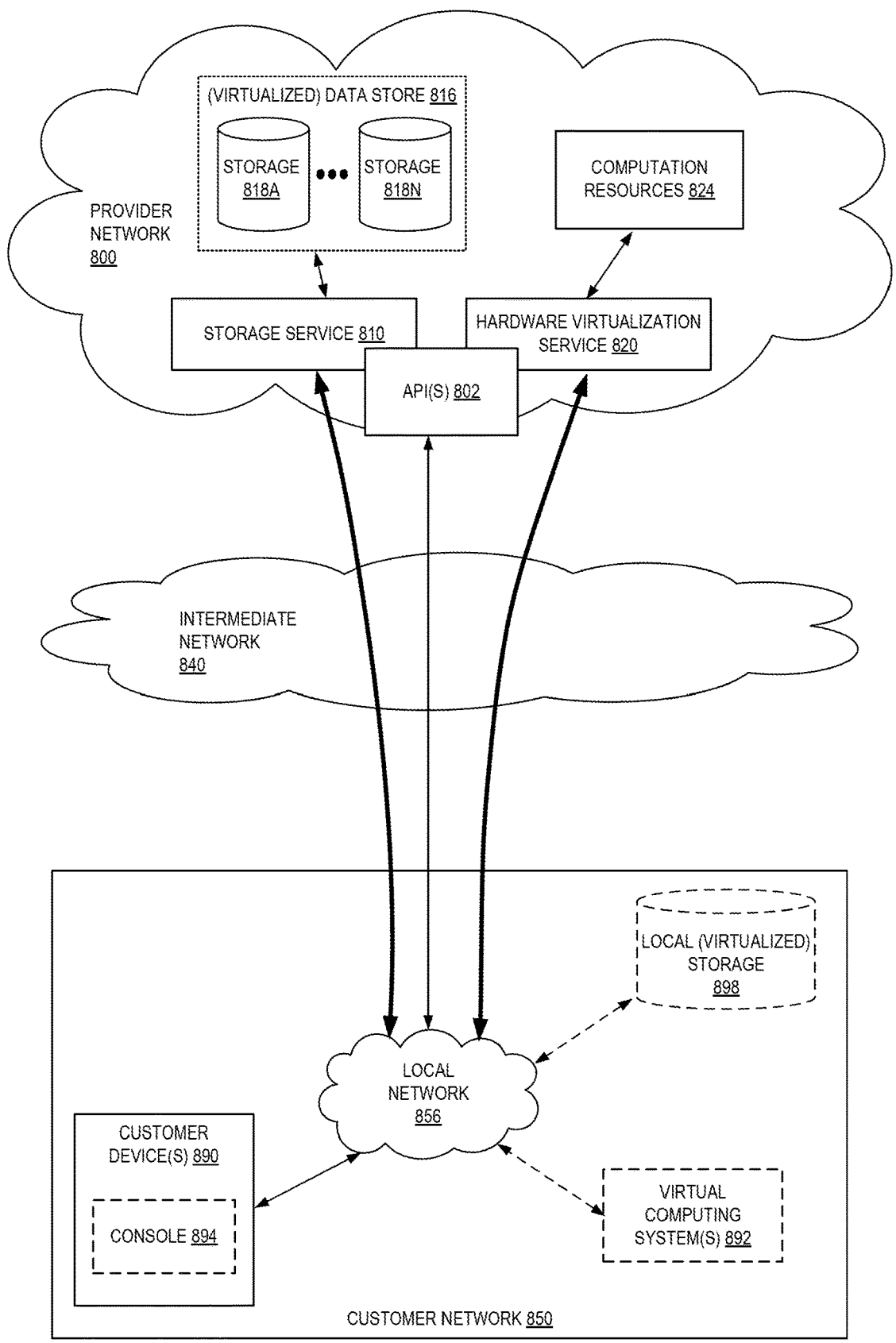
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
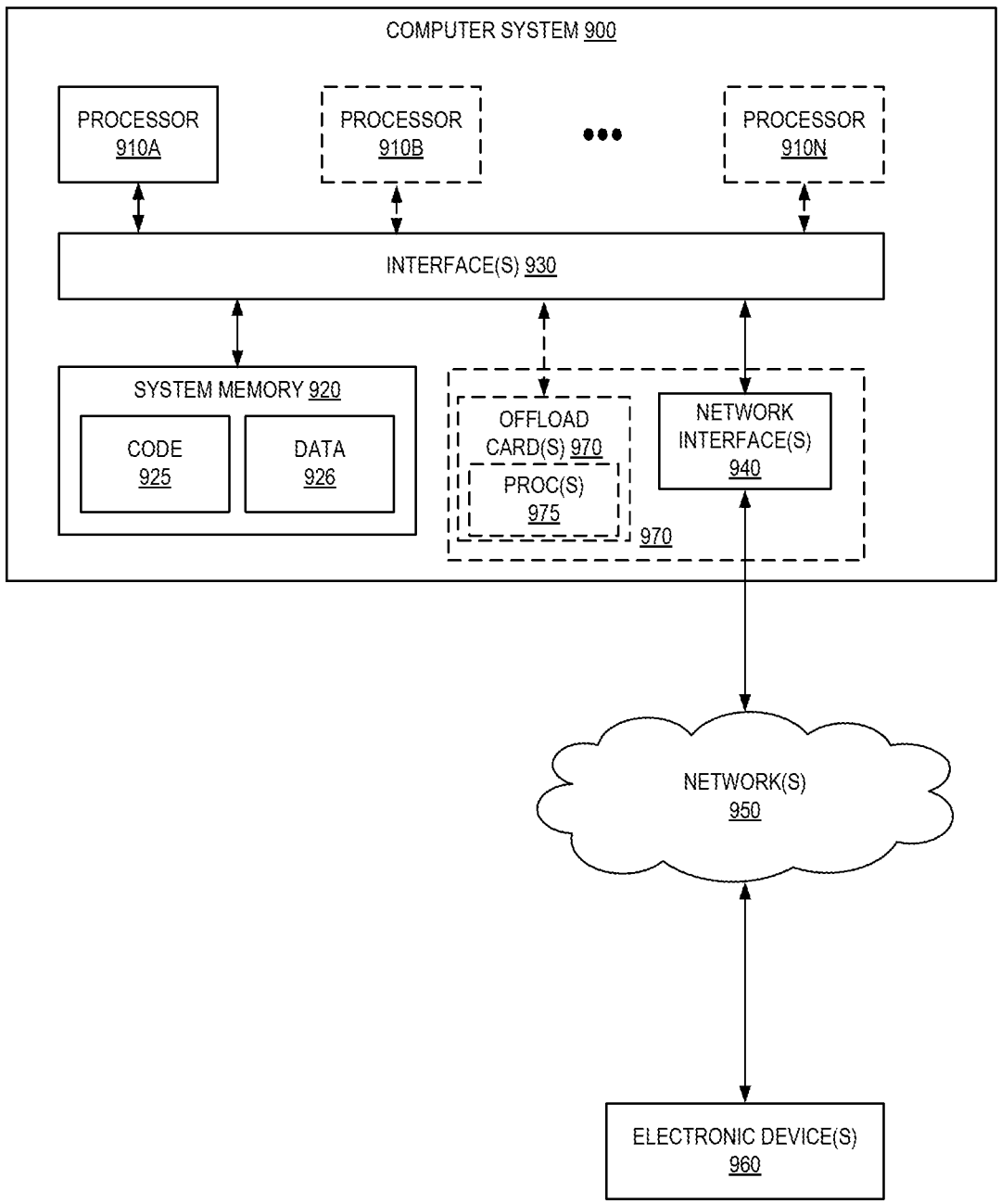
FIG. 9 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving, at a multi-tenant provider network, a dataset comprising a plurality of columns of values;
storing the dataset at a storage location of the provider network;
receiving a request message originated by a computing device of a user to perform feature engineering analysis on the dataset, the request message including an identifier of the storage location;
generating a plurality of sets of data facts for each of the plurality of columns by a plurality of analyzers executed by one or more compute instances of the provider network, wherein each of the plurality of sets of data facts for a column is generated based at least in part on the values of the column, and wherein the data facts for each of the plurality of columns describe the values of the respective column;
combining, by a combination engine, the plurality of sets of data facts into a plurality of sets of data statements that are condensed representations of the dataset;
generating, by a plurality of interpretation engines, a corresponding plurality of feature engineering pipelines based at least in part on the plurality of sets of data statements, but not based on the dataset, wherein each of the plurality of feature engineering pipelines identifies operations to transform the dataset into a plurality of features for machine learning; and
transmitting one or more of the plurality of feature engineering pipelines to the computing device of the user.

2. The computer-implemented method of claim 1, wherein the generating of the plurality of feature engineering pipelines does not involve scanning the dataset.

3. The computer-implemented method of claim 1, further comprising:
generating one or more feature sets using one or more of the plurality of feature engineering pipelines; and
causing one or more machine learning models to be trained based on the one or more feature sets.

4. A computer-implemented method comprising:
obtaining a dataset comprising at least a column of values;
generating, by a plurality of analyzers, a plurality of sets of data facts for the column based at least in part on the values of the column, wherein the data facts describe the values of the column;
combining, by a combination engine, the plurality of sets of data facts into a plurality of sets of data statements that are condensed representations of the dataset;
generating, by a plurality of interpretation engines, a corresponding plurality of feature engineering pipelines based at least in part on the sets of data statements, but not based on the dataset, wherein each of the plurality of feature engineering pipelines identifies operations to transform the dataset into one or more features for machine learning; and
transmitting the plurality of feature engineering pipelines.

5. The computer-implemented method of claim 4, wherein at least one of the plurality of feature engineering pipelines specifies that values from or derived from the column are to be normalized, imputed, or dropped.

6. The computer-implemented method of claim 4, wherein the analyzer comprises:
a string analyzer;
an email address analyzer;
a unique identifier analyzer;
a hierarchical data format analyzer;
a datetime analyzer;
a phone number analyzer;
an address analyzer;
a numeric analyzer; or
any combination thereof.

7. The computer-implemented method of claim 4, wherein at least one of the plurality of feature engineering pipelines specifies that values from or derived from the column are to be one-hot encoded.

8. The computer-implemented method of claim 4, further comprising:
generating one or more feature sets using one or more of the plurality of feature engineering pipelines; and
causing one or more machine learning models to be trained based on the one or more feature sets.

9. The computer-implemented method of claim 4, wherein each of the plurality of interpretation engines implements a different processing strategy.

10. The computer-implemented method of claim 4, wherein at least one of the plurality of feature engineering pipelines specifies that a dimensionality reduction algorithm is to be executed.

11. The computer-implemented method of claim 4, wherein transmitting the plurality of feature engineering pipelines comprises transmitting code for generating the one or more features to a computing device of a user.

12. The computer-implemented method of claim 4, further comprising:
training a plurality of machine learning (ML) models using the plurality of feature engineering pipelines.

13. The computer-implemented method of claim 12, further comprising:
determining a best-performing ML model of the plurality of ML models; and
sending a message to a computing device of a user that identifies the best-performing ML model or deploying the best-performing ML model for inference.

14. The computer-implemented method of claim 4, wherein at least one of the plurality of feature engineering pipelines specifies that a feature set is to be generated having more or fewer columns than a number of the columns of the dataset.

15. A system comprising:
a machine learning (ML) training system implemented by a first one or more electronic devices; and
a feature engineering engine implemented by a second one or more electronic devices, the feature engineering engine including instructions that upon execution cause the feature engineering engine to:
obtain a dataset comprising at least a column of values;
generate, by a plurality of analyzers, a plurality of sets of data facts for the column of the dataset based at least in part on the values of the column, wherein the data facts describe the values of the column of the dataset;
combine, by a combination engine, the plurality of sets of data facts into a plurality of sets of data statements that are condensed representations of the dataset;
generate, by a plurality of interpretation engines, a corresponding plurality of feature engineering pipelines based at least in part on the sets of data statements, but not based on the dataset, wherein each of the plurality of feature engineering pipelines indicates how to transform the dataset into one or more features for machine learning; and
cause the ML training system to utilize at least one of the plurality of feature engineering pipelines to generate a set of features and use the set of features to train a ML model.

16. The system of claim 15, wherein the feature engineering engine, to cause the ML training system to utilize at least one of the plurality of feature engineering pipelines, is to:
cause the ML training system to utilize all of the plurality of feature engineering pipelines to generate a plurality of sets of features and use the plurality of sets of features to train a plurality of ML models.

17. The system of claim 15, wherein at least one of the plurality of feature engineering pipelines specifies that a dimensionality reduction algorithm is to be executed.

18. The system of claim 15, wherein the analyzer comprises:
an email address analyzer;
a unique identifier analyzer;
a hierarchical data format analyzer;
a datetime analyzer;
a phone number analyzer;
an address analyzer;
a numeric analyzer; or
any combination thereof.

19. The system of claim 15, wherein at least one of the plurality of feature engineering pipelines specifies that values from or derived from the column is to be one-hot encoded.

20. The system of claim 15, wherein at least one of the plurality of feature engineering pipelines specifies that a feature set is to be generated having more or fewer columns than a number of the columns of the dataset.

* * * * *